United States Patent [19]
Schwartz

[11] 3,981,573
[45] Sept. 21, 1976

[54] AUDIO-VISUAL SLIDE PROJECTION SYSTEM

[75] Inventor: Robert C. Schwartz, Woodmere, N.Y.

[73] Assignee: Motiva, Ltd., New York, N.Y.

[22] Filed: July 29, 1975

[21] Appl. No.: 600,000

[52] U.S. Cl. .................................... 353/15; 353/37
[51] Int. Cl.² .................... G03B 21/22; G03B 21/00
[58] Field of Search .................. 353/15, 18, 30, 37, 353/94, 99, 76; 352/70; 355/65, 66, 57; 350/50

[56] References Cited
UNITED STATES PATENTS

| | | | |
|---|---|---|---|
| 1,230,188 | 6/1917 | McCormick | 353/30 |
| 2,669,901 | 2/1954 | Rehorn | 353/99 |
| 2,851,922 | 9/1958 | Rosen | 353/76 |
| 2,882,420 | 4/1959 | Koulicovitch | 350/50 |
| 3,036,496 | 5/1962 | Frederick | 353/30 |
| 3,507,571 | 4/1970 | White | 353/15 |
| 3,804,503 | 4/1974 | Sisson | 353/15 |
| 3,822,936 | 7/1974 | Troje | 353/99 |

FOREIGN PATENTS OR APPLICATIONS

| | | | |
|---|---|---|---|
| 61,859 | 10/1913 | Austria | 353/30 |

Primary Examiner—Harry N. Haroian

[57] ABSTRACT

A highly-compact audio-visual slide projection system which makes use of an array of co-planar rear-view screen sections forming a screen matrix for presenting images selectively derived from an adjacent array of individual slide projectors. Interposed between each screen section and its correspondingly-positioned projector on the same level therewith is a V-shaped reflector assembly whose inclined front leg faces the screen section and whose reversely-inclined rear leg faces the corresponding projector. The image from the corresponding projector is forwardly directed onto an underside mirror on the rear leg of the same-level reflector assembly, which reflects the image downwardly onto an upperside mirror on the rear leg of the reflector assembly on the level below, which upperside mirror directs the image forwardly toward an upperside mirror on the front leg of the level-below assembly, this mirror, in turn, reflecting the image upwardly onto an underside mirror on the front leg of the same-level assembly, from which the image is cast onto the associated screen section, whereby an extended optical path is provided within a relatively confined space, making possible narrow angle, high-quality projection.

9 Claims, 7 Drawing Figures

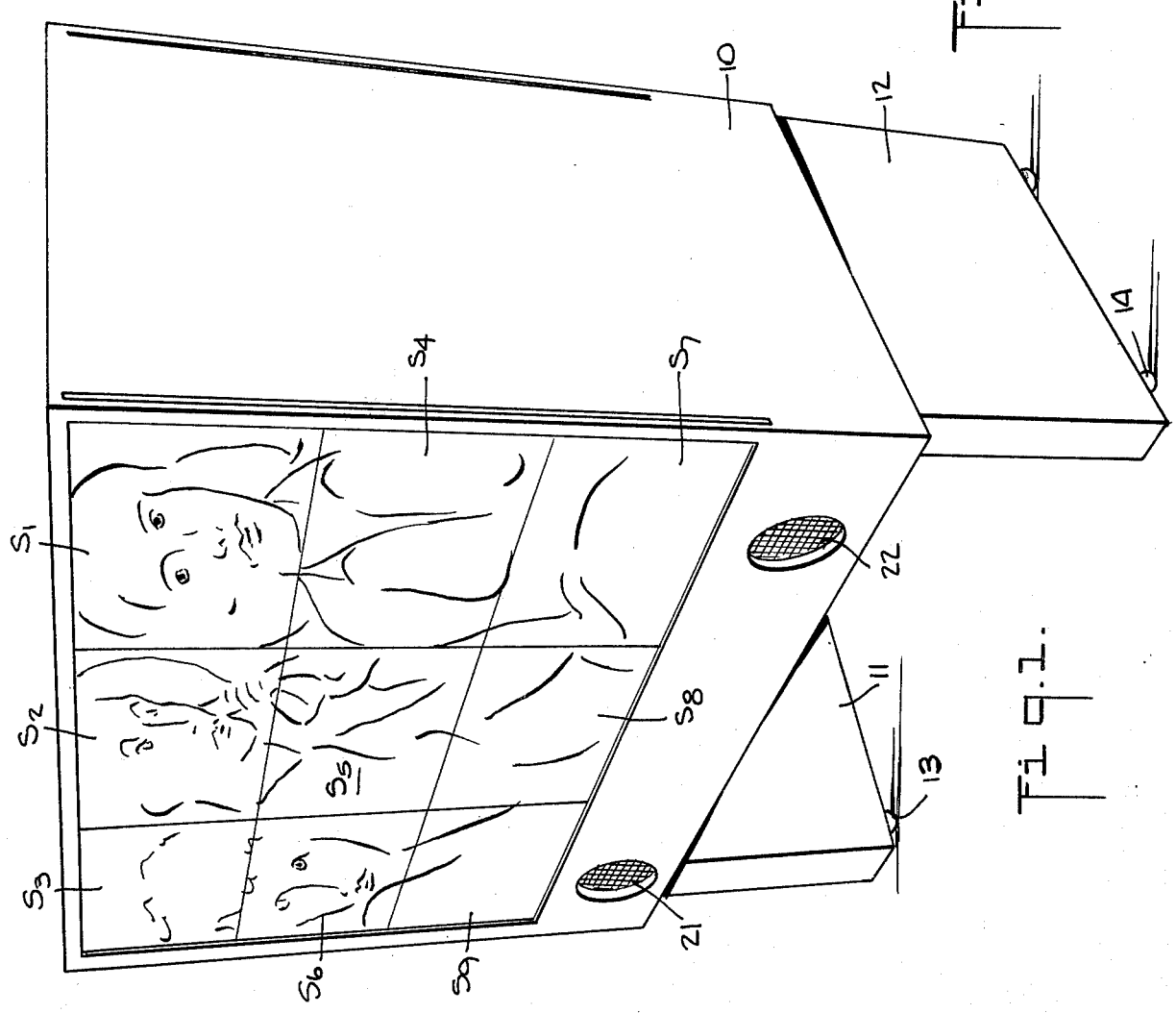
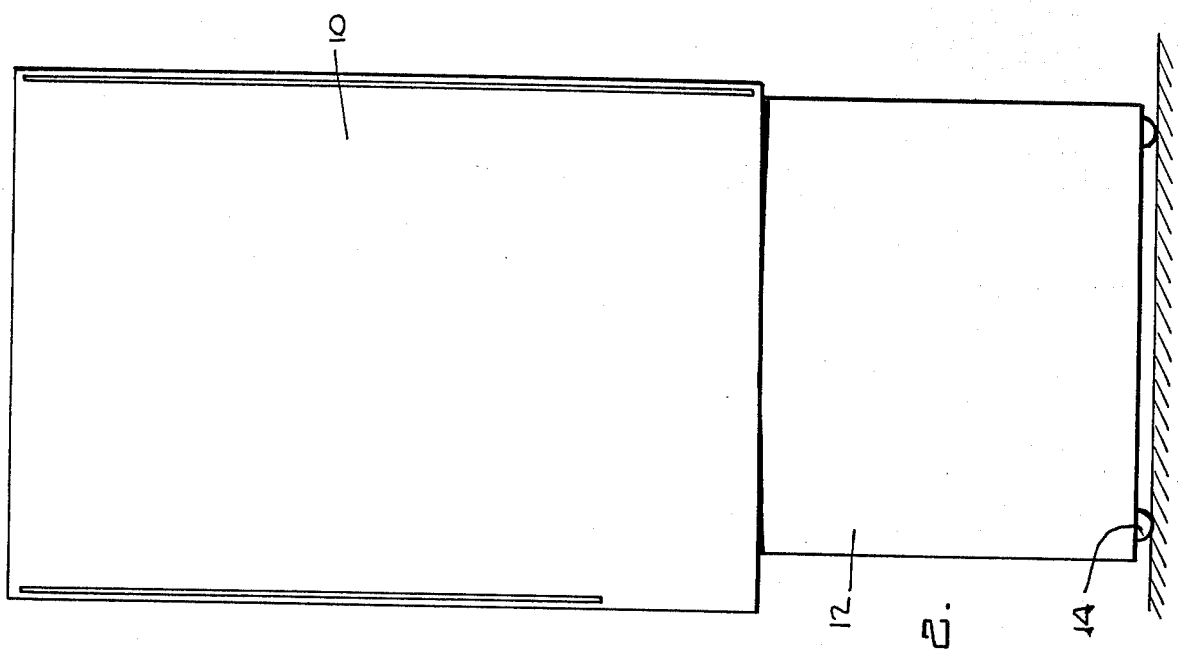

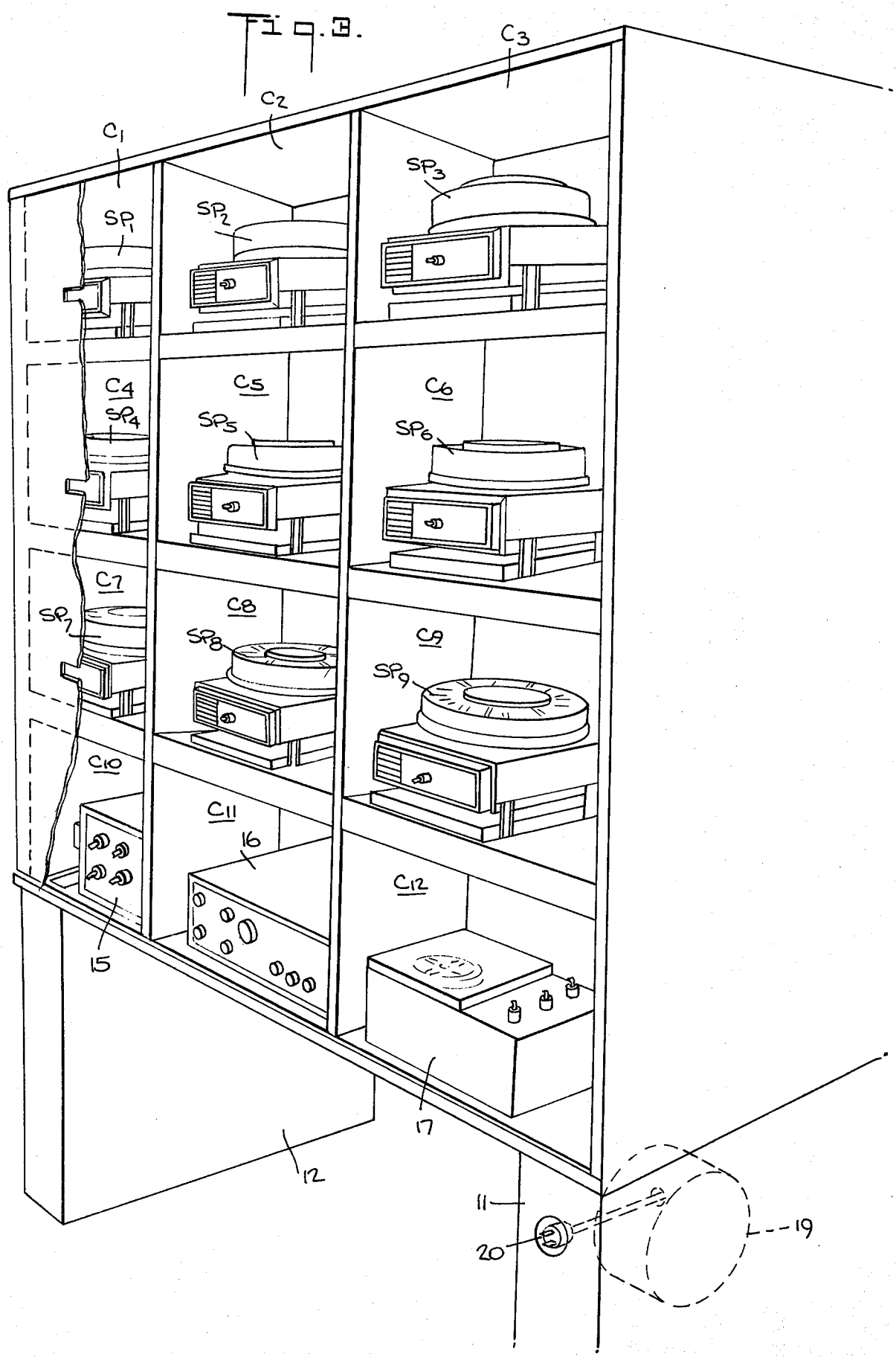

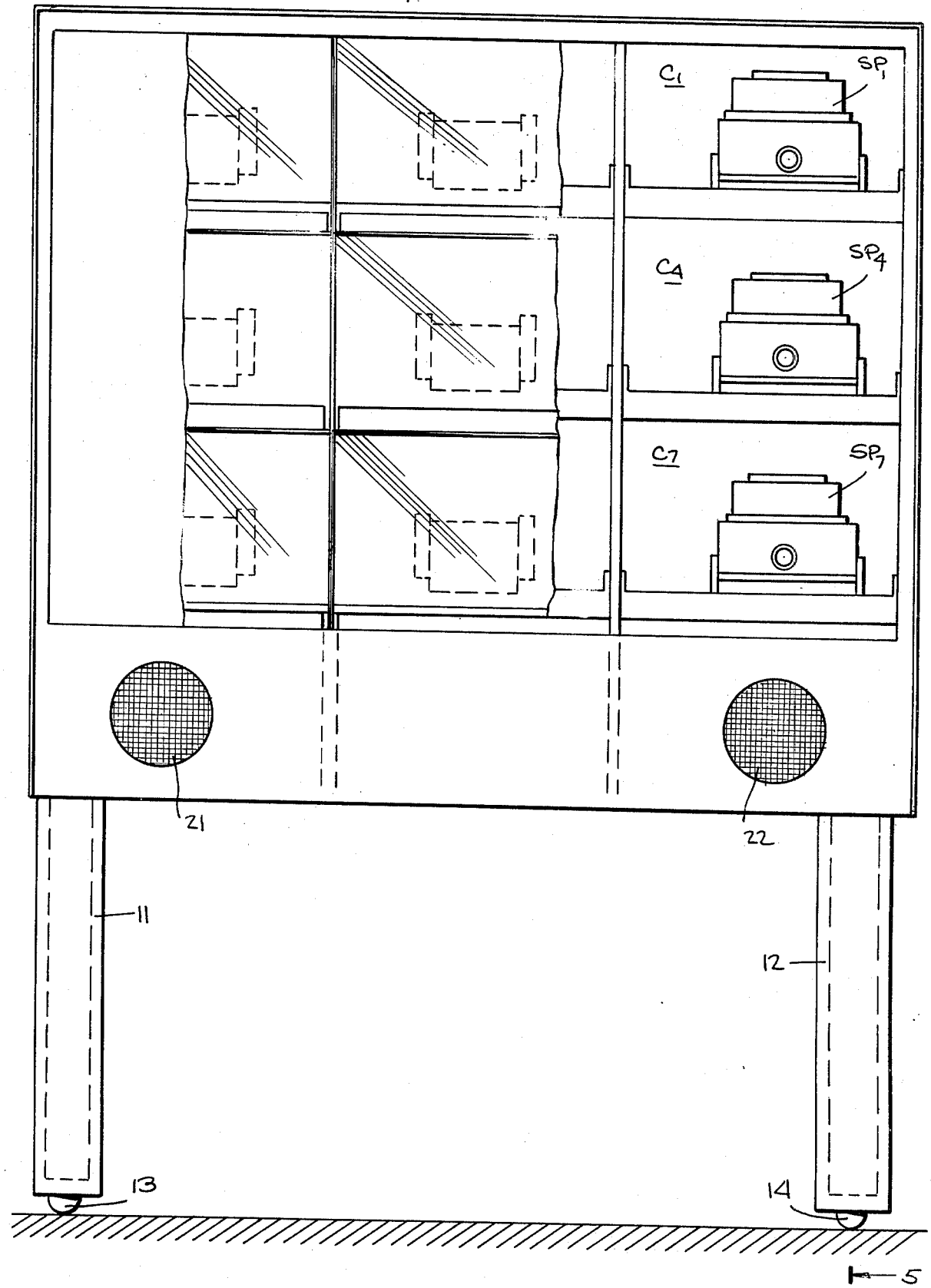

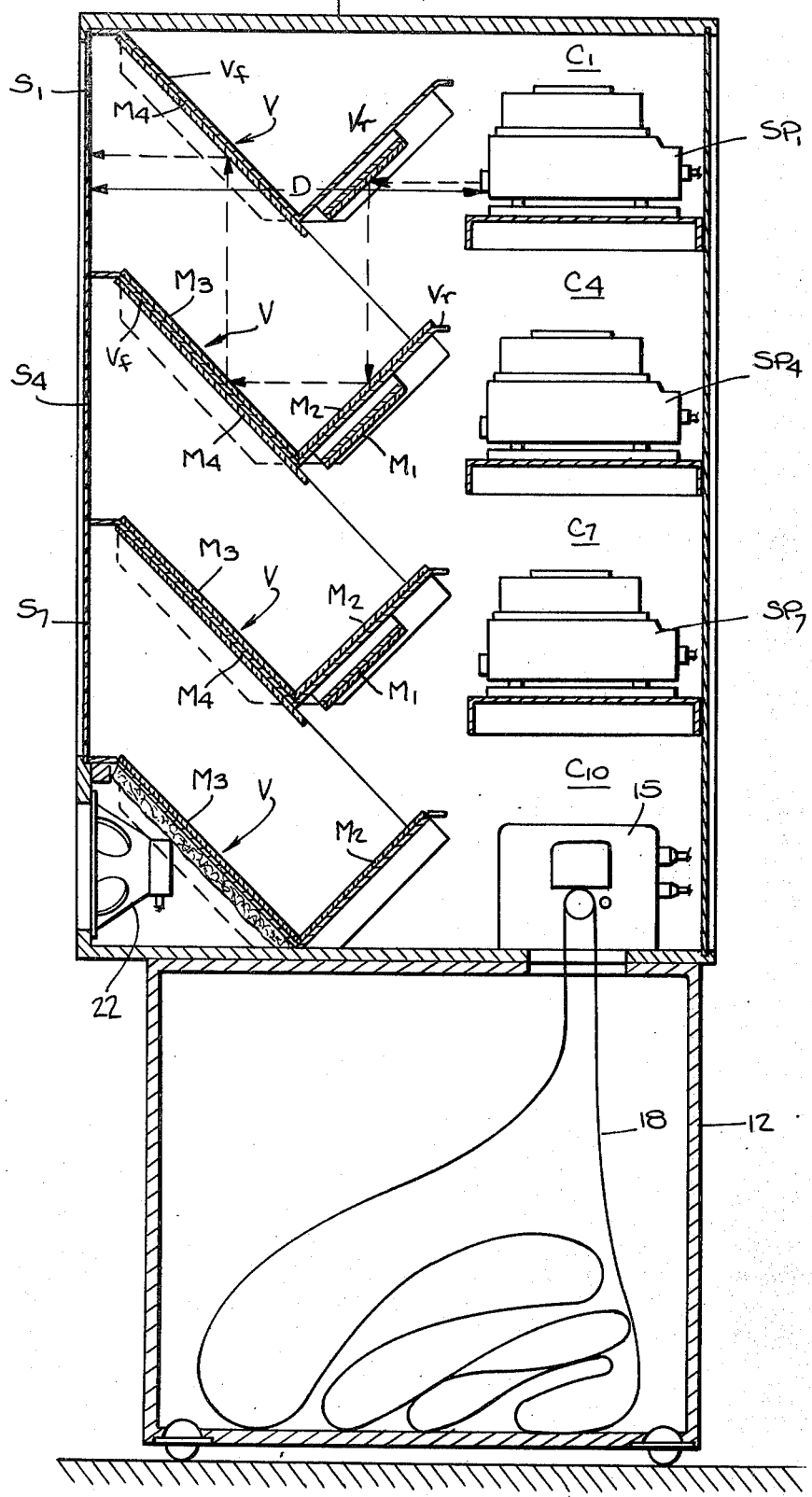

AUDIO-VISUAL SLIDE PROJECTION SYSTEM

BACKGROUND OF THE INVENTION

This invention relates generally to rear-screen film-slide projection arrangements, and more particularly to a mobile, audio-visual system which includes a multiscreen matrix on which there are displayed images selectively derived from an array of programmed slide projectors.

In order to present film slides in a continuous sequence, existing slide projectors employ slide trays in conjunction with an indexing mechanism adapted to transfer the slides successively into an optical path for projection. Thus in slide projectors manufactured by Eastman Kodak Company under the trademark "Carousel" and "Ektagraphic," the slide tray is in the form of a turntable that is indexed to successively project slides withdrawn from the circular array thereof. A description of a Kodak Ektagraphic Slide Projector Model AF may be found in the Eastman Kodak publication of January 1969, RPP-AX pub. pt. no. 634402.

In a conventional front-view projector, the picture is cast onto the front of a screen erected at a suitable distance from the projector. This arrangement is generally acceptable in a home where the room may be darkened and the screen may be conveniently placed therein. However, the viewability of an illuminated visual image is determined in large measure by contrast with its background. In front-view projection, the screen brightness is directly affected by ambient lighting conditions, and in a brightly-lit room it is virtually impossible to see the image.

To overcome the drawbacks of front-view screen projection, rear-screen projectors have been developed which make viewing feasible under relatively bright ambient conditions. Thus the prior Schwartz Pat. No. 3,560,088 discloses a projection theater in which images from a slide projector are directed onto an inclined mirror which reflects the images upwardly toward a second inclined mirror, the second mirror, in turn, casting the images onto the rear of a translucent screen.

It is also known to provide an audio-visual system making use of an array of rear-view screen slide projector theatre units which are joined together so that the screens form the sections of a large matrix. Thus the Multi-Visual Synthesizer developed by Motiva, Ltd. and described in the June 1972 issue of "Exhibit" magazine makes use of an assembly of rear-view slide projection units, each housing a standard Eastman Kodak slide projector. The slide projectors in the array are selectively and individually controlled by a punched-tape programmer in tandem with high-fidelity amplifiers and continuous loop cartridge tape-playback machines.

The system disclosed in "Exhibit" is formed by a multi-section screen matrix of fifteen slide projectors controlled by the respective channels of the punched tape programmer. Each channel acts to activate the associated projector in accordance with the program therefor defined by a track of punch holes. For example, if on a given transverse line on the multi-channel tape, there is a punch hole in each of the fifteen channels, then when this line reaches the read-out device, all fifteen projectors are simultaneously actuated. But if at this line there is a punch hole, say only for the third, fifth and ninth projectors, then only these projectors are actuated when the line is reached.

Thus at a given time, the screen matrix may have a different image displayed in each section thereof, or only selected sections may be activated to create a pattern of images, the other sections then being blank. At other times in the course of a program, all sections of the matrix may be activated to display a single, highly-enlarged sectioned image, each projector supplying a respective section of the total image. With multiple slide-projector units and a programmer having a distinct channel to choreograph the effects produced by the units as well as a channel to coordinate therewith the accompanying stereophonic sound, it becomes possible to create audio-visual effects in which image sequencing, patterning and counterpoint are correlated with sound or background music.

Because of the rear-projection arrangement, a Motiva Multivisual Synthesizer is usable under high ambient-lighting conditions, such as in shopping center malls, building lobbies and exhibit areas. And because the system is capable of continuous and unattended operation, it is particularly suitable for situations where people enter and leave at random intervals, such as in museums and side shows.

Though an audio-visual system of the known type is useful in many aspects of communication, including sales promotion, education and entertainment, it suffers from one serious practical drawback. This drawback resides not in the cost of purchasing or leasing the system, which is modest, but in the expenses involved in installation. A system of the type heretofore known lacks mobility and cannot be wheeled into a truck for transportation. Nor can the system be passed through a typical doorway (about 34 inches wide).

Hence it was heretofore the practice to ship the required number of slide projection theatre units to the site where they were assembled to create the desired matrix, and to set up at the site and wire-in the necessary programmer, audio amplifier, speakers and tape play-back machine. This installation procedure was time-consuming and costly, and therefore discouraging to many potential users of the audiovisual slide projection system.

SUMMARY OF INVENTION

In view of the foregoing, the main object of this invention is to provide a highly-compact, fully-integrated audio-visual slide projection system wherein images selectively derived from an array of individual slide projectors are presented on related sections of a rear-view screen matrix.

More specifically, it is an object of this invention to provide an audio-visual system of the above-type which is housed in a mobile structure that also contains a punched-tape programmer operating in conjunction with a tape-playback machine.

A salient feature of the invention is that the overall dimensions of the structure which incorporates the entire audio-visual system are such as to make it possible, without difficulty, to pass the structure through doorways of standard size, so that the system may be wheeled to any desired site, such as an office, classroom, meeting hall of theatre stage, and immediately rendered operative.

Also an object of this invention is to provide a system of the above-type in which the optical path between each projector and its associated rear-view screen sec-

3 tion is relatively long, despite the fact that the straight line distance between the projector and the screen section is short, so that the compactness and mobility of the structure is attained without sacrificing optical quality.

Briefly stated, these objects are accomplished in a system that includes an array of rear-view co-planar screen sections forming a screen matrix for presenting images selectively derived from an adjacent array of individual slide projectors, each projector having a supply of slides and an indexing mechanism adapted to transfer slides from the supply successively into an optical path for projection, the indexing mechanisms of the projectors being controlled by a programmer.

Interposed between each screen section of the screen matrix and its correspondingly-positioned projector on the same level therewith is a V-shaped reflector assembly whose inclined front leg faces the screen section and whose reversely-inclined rear leg faces the corresponding projector.

The image from the corresponding projector is forwardly directed onto an underside mirror on the rear leg of the reflector-assembly on the same level therewith, which underside mirror directs the image downwardly onto an upperside mirror on the rear leg of the assembly on the level therebelow, which upperside mirror forwardly directs the image onto an upperside mirror on the front leg of the level-below assembly. This upperside mirror on the level-below assembly, in turn, directs the image upwardly onto an underside mirror on the front leg of the same-level assembly, from which the image is cast onto the associated screen section, whereby an extended optical path is provided between the projector and the screen section despite the short, straight line distance therebetween.

OUTLINE OF DRAWINGS

For a better understanding of the invention as well as other objects and further features thereof, reference is made to the following detailed description to be read in conjunction with the accompanying drawings, wherein:

FIG. 1 is a front perspective view of a mobile structure which incorporates an audio-visual slide projection system in accordance with the invention;

FIG. 2 is an end view of the structure;

FIG. 3 is a rear perspective view of the structure;

FIG. 4 is a front elevational view of the structure, partly cut away to expose the interior thereof;

FIG. 5 is a transverse section taken in the plane indicated by line 5—5 in FIG. 4;

DESCRIPTION OF INVENTION

Figure 6:
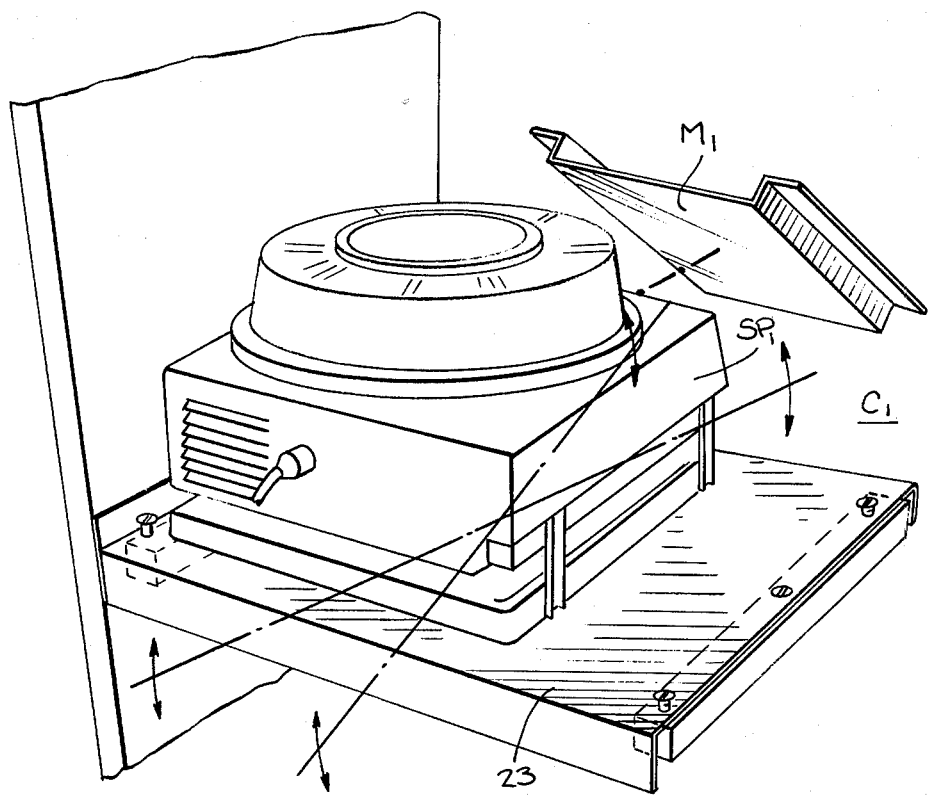
FIG. 6 is a perspective view of one of the slide projection units.

Referring now to FIGS. 1 to 4, there is shown a mobile, audio-visual multiple slide projection system in accordance with the invention, the entire system being contained in a rectangular housing or cabinet 10 mounted on a pair of hollow pedestals 11 and 12. The pedestals are provided with casters 13 and 14, making it possible to wheel the system to any desired site along narrow passages and through standard doorways.

The normal width of a doorway is about 34 inches, whereas the width of the housing is somewhat less than this value. The total height of the housing and pedestals is well below the usual height of a doorway, so that no difficulty is experienced in rolling the system into a schoolroom an office or any other site to which access is had through doors of ordinary size.

The audio-visual system is completely self-contained and, in the example illustrated, is constituted by nine conventional slide projections $SP_1$ to $SP_9$, which are seated within a honeycomb of nine cells $C_1$ to $C_9$, formed by partitions within the rear portion of the housing. As shown in FIG. 3, three additional cells $C_{10}$ to $C_{12}$ serve respectively to accommodate a programmer 15, a high-fidelity amplifier 16 and a magnetic-tape cartridge player 17.

Programmer 15 is of the punched-tape type described in greater detail in the above-identified "Exhibit" article, the multi-channel punched tape 18 being in a continuous loop form. The hollow pedestal 12, which lies below the read-out head of the programmer, serves as a storage space for the punched tape 18, as shown in FIG. 5. Hollow pedestal 11 contains a reel 19, as shown in FIG. 3, on which is retractably wound the power cable for the system, the cable terminating in a male plug 20 on the exterior of the pedestal. Hence to plug in the system, one merely has to pull out the cable by means of plug 20 and insert the plug in an available power line socket. When not in use, the cable is wound on the reel.

Tape deck 17 provides the sound or musical effects which accompany the slide presentation, the deck being coupled to amplifier 16 whose output is fed to a pair of sterophonic speakers 21 and 22. The present invention is not concerned with the structure or function of the programmer or of the tape deck, for the audio-visual system disclosed herein behaves in essentially the same manner as the system disclosed in the "Exhibit" article.

The invention making it possible to house the entire system in a highly-compact cabinet, resides in a unique optical arrangement interposed between the array of individual slide projectors $SP_1$ to $SP_9$ and the array of coplanar rear-view screen sections $S_1$ to $S_2$, which together form a screen mosaic onto which the images from the correspondingly-numbered projectors are presented under the control of the programmer.

The array of screen sections is closely adjacent to the array of slide projectors in order to provide a structure whose depth or width is suitable for passage through doorways. In practice, the array of screen sections may be supported within a honey-comb frame which is removable from the cabinet for cleaning or to further reduce the depth of the structure to facilitate passage through very narrow spaces.

Consequently, the straight line distance D between each screen section and its correponding projector is quite short. This short distance does not preclude the direct casting of images from the lens ($L_1$ to $L_9$) of each projector onto the associated screen section, but in order to do so, it would be necessary to use a lens having an exceptionally wide angle.

Since the illumination of a screen section varies in brightness as the square of the distance, the horizontal axis of projection will have a length equal to distance D whereas the inclined optical lines between the edges of the screen and lens will be substantially longer because of the wide angle. As a result, the illumination will be bright in the center of the screen and become progressively dimmer as one moves toward the edges.

Not only is such graduated screen illumination commercially unacceptable, but there is the further problem of optical distortion that is often encountered with a wide angle lens of ordinary quality. Hence, while it is theoretically possible to have a short optical path between a slide projector and the rear-view screen associated therewith, it is not practical to do so.

The significant feature of the present invention lies in the inclusion of reflector assemblies between the projectors and the screen sections which function to effectively lengthen the optical path therebetween, thereby making it possible to use narrow angle lens projection and to gain the advantages incident to such projection. With narrow angle lens projection, the screen illumination is substantially uniform and virtually free of optical distortion, assuming that the projection lens is of reasonably good quality.

Thus as shown in FIG. 5, interposed between each projector and its associated screen is a V-shaped reflector assembly generally designated by the letter V, the assembly having an inclined front leg $V_f$ and a reversely-inclined rear leg $V_r$. The front leg faces the related screen section and the near leg faces the lens of the corresponding slide projector.

The legs of the reflector assemblies are provided with underside and upperside mirrors in an optical arrangement which we will now explain in connection with projector $SP_1$ in FIG. 5. This projector is on the same array level as its corresponding screen section $S_1$. The slide image projected forwardly by lens $L_1$ of projector $SP_1$ is directed forwardly onto an inclined underside mirror $M_1$ on the rear leg of assembly V on the same level as projector $SP_1$. Mirror $M_1$ directs this image downwardly onto a parallel upperside mirror $M_2$ on the rear leg $V_r$ of the assembly V on the level below.

Mirror $M_2$ then directs the image forwardly onto an upperside mirror $M_3$ on the front leg of the level-below assembly V, which mirror directs the image upwardly onto a parallel underside mirror $M_4$ on the front leg of the same-level assembly. Mirror $M_4$ then casts the image forwardly onto screen section $S_1$, where it is presented to the viewer.

Thus the resultant square-wave optical path between lens $L_1$ and screen section $S_1$ formed by mirror $M_1$ and $M_4$ of the same level assembly and mirrors $M_2$ and $M_3$ of the below-level assembly is considerably longer than the straight line path between these two points, so that it becomes possible to use narrow-angle projection with its attendant advantages.

Similarly, lens $L_4$ of projector $SP_4$ (FIG. 5) cooperates with its own same-level assembly V and with the assembly therebelow to provide narrow-angle projection onto screen section $S_4$. It is to be noted that the lowermost reflector assembly V acts only as a below-level assembly, for it is not associated with a projector on the same level, and that the uppermost reflector V assembly acts only as a same-level assembly, for it is not associated with a projector on the level above.

It will be appreciated that while the array of projectors has three vertical levels, a greater number of levels may be used, and that while the array has three projector columns, a greater number of columns may be employed to increase the number of sections forming the screen mosaic, and thereby enlarge the visual display permutations.

Figure 7:
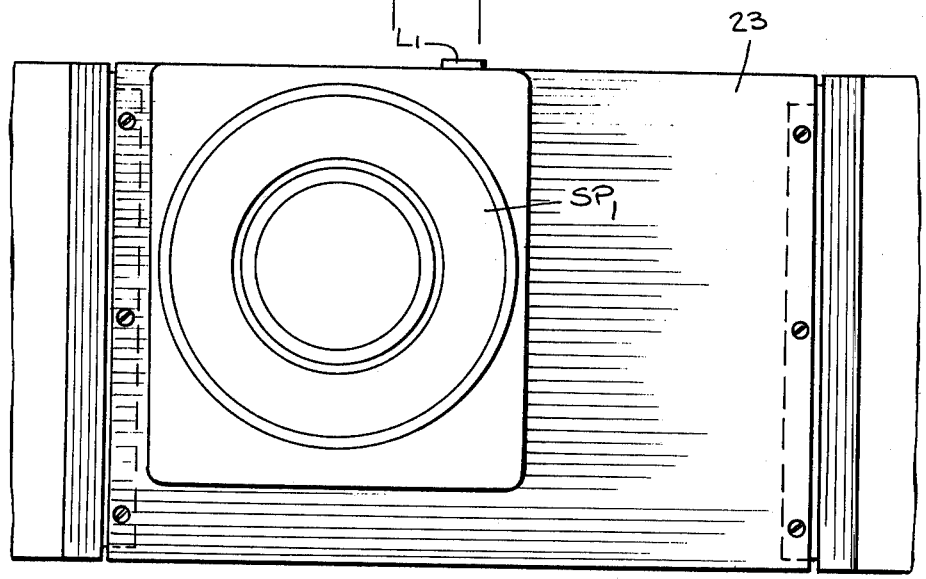
FIG. 7 is a plan view of the projection unit shown in FIG. 6.

As shown in FIGS. 6 and 7, each of the slide projectors, such as projector $SP_1$, is so mounted on the baseboard 23 of its cell ($C_1$) so that it may be precisely oriented to occupy the proper optical position with respect to its associated reflector assembly. But in practice, instead of a cellular arrangement, the projectors may be attached at their corners and stacked one above the other on vertically-extending pipes, the attachment between the pipes and the projectors being effected by settable universal coupling elements, making it possible to properly orient the projectors.

In an actual embodiment of the invention, the height of the structure is 66 inches, whereas the width of the structure is 33⅜ inches. With the matrix screen panel removed, the width is then 29⅜ inches. Because of these dimensions, the structure can be wheeled through standard doorways and it can also be moved through standard passenger elevators and through the doors of conventional trucks. Thus there are no practical restrictions on the movement of the structure which may therefore be placed in any suitable site.

While the programmer disclosed herein is of the punched-tape type, in practice one may use non-mechanical programmers of the solid-state type in which the program for actuating the slide projectors is stored in integrated circuit chips.

While there has been shown and described embodiment of an audio-visual slide projection system in accordance with the invention, it will be appreciated that many changes and modifications may be made therein without, however, departing from the essential spirit thereof.

I claim:
1. A multiple slide projection system comprising:
   A. a vertical array of individual slide projectors, each including a projection lens having a horizontal optical axis, a supply of slides and an indexing mechanism to transfer slides successively from the supply to an optical path leading to the projection lens for projection of slide images along said axis;
   B. a vertical array of co-planar rear view screen sections to form a mosaic screen matrix adjacent the array of projectors, each section of the matrix lying in the vertical plane and being associated with a corresponding projector on the same level to present the slide image projected by said corresponding projector;
   C. an upright V-shaped reflector assembly interposed between each screen section and its corresponding projector on the same array level, said each same-level assembly having an inclined front leg which faces the screen section and a reversely-inclined rear leg which faces the projection lens of the corresponding projector, each said front and rear leg of each assembly having mirrors on the upperside and the underside thereof, each said assembly being positioned in the optical axis of each projector and screen section so that the underside mirror on the rear leg receives an image from the lens and directs it downwardly onto the upperside mirror on the rear leg of the V-shaped reflector assembly on the level below, which mirror directs the image forwardly toward the upperside mirror on the front leg of the level-below assembly, which mirror directs the image upwardly onto the underside mirror on the front leg of the same-level assembly, which mirror in turn projects the image onto the assoicated screen section, whereby the opitical path between each lens and each screen section is substantially longer than the straight line distance therebetween.

2. A system as set forth in claim 1, further including programming means operatively coupled to the indexing mechanisms of the projectors to effect the selective presentation of slide images on the sections of the screen mosaic.

3. A system as set forth in claim 2, wherein said entire system is housed in a common cabinet whose front panel is defined by said mosaic.

4. A system as set forth in claim 3, wherein said cabinet is partitioned into cells to accommodate said projectors.

5. A system as set forth in claim 4, further including a tape play-back machine whose operation is coordinated by said programmer with the projectors to provide sounds to accompany the screen presentation.

6. A system as set forth in claim 1, wherein said lens is a narrow-angle lens.

7. A system as set forth in claim 3, wherein the width of said cabinet is less than 34 inches, whereby the cabinet may be passed through a doorway.

8. A system as set forth in claim 1, wherein said slide supply is held in a circular tray, making it possible to continuously recycle the presentation.

9. A system as set forth in claim 2, wherein said programmer means includes a multi-channel punched tape, one for each projector.

* * * * *

UNITED STATES PATENT OFFICE
CERTIFICATE OF CORRECTION

PATENT NO. : 3,981,573
DATED : Sept. 21, 1976
INVENTOR(S) : Robert C. Schwartz

It is certified that error appears in the above-identified patent and that said Letters Patent are hereby corrected as shown below:

Column 1, line 7 "multis-" should have read -- multi- --
line 8 "creen" should have read -- screen --

Column 2, line 64 "of" should have read -- or --

Signed and Sealed this

Twenty-ninth Day of March 1977

[SEAL]

Attest:

RUTH C. MASON
Attesting Officer

C. MARSHALL DANN
Commissioner of Patents and Trademarks